US005451285A

United States Patent [19]

Santo et al.

[11] Patent Number: 5,451,285

[45] Date of Patent: Sep. 19, 1995

[54] PANEL SWITCH AND METHOD FOR MAKING SAME

[75] Inventors: Kouichi Santo, Katano; Nobuo Ogasawara, Hirakata, both of Japan

[73] Assignee: Matsushita Electric Industrial Co., Ltd., Osaka, Japan

[21] Appl. No.: 133,475

[22] Filed: Oct. 7, 1993

Related U.S. Application Data

[62] Division of Ser. No. 56,105, May 3, 1993, Pat. No. 5,286,937, which is a division of Ser. No. 499,454, Jun. 27, 1990, Pat. No. 5,224,591.

[30] Foreign Application Priority Data

Nov. 7, 1988 [JP] Japan ............................... 63-280811

[51] Int. Cl.$^6$ ............................................ B32B 31/00

[52] U.S. Cl. ...................................... 156/264; 29/622; 156/152; 156/249; 156/289; 156/292; 200/516

[58] Field of Search ............... 156/152, 249, 264, 292, 156/289; 29/622; 200/516

[56] References Cited

U.S. PATENT DOCUMENTS 4,033,030 7/1977 Robinson et al. ..................... 29/622
4,153,987 5/1979 Boulanger ............................ 29/622

FOREIGN PATENT DOCUMENTS 58-166619 10/1983 Japan .
60-22 1/1985 Japan .

*Primary Examiner*—John J. Gallagher
*Attorney, Agent, or Firm*—Panitch Schwarze Jacobs & Nadel

[57] ABSTRACT

A panel switch for use in electronic apparatus and a method for making same, the panel switch employing a diaphragm whereby the operator turns on the switch with a feeling of security. To locate a diaphragm, a sheet having an adhesive layer on one side is used instead of a conventional spacer, and the diaphragm is secured to an insulated substrate with the sheet. The non-use of the spacer saves cost and labor, thereby producing panel switches more economically.

2 Claims, 5 Drawing Sheets

PANEL SWITCH AND METHOD FOR MAKING SAME

This is a division of application Ser. No. 08/056,105, filed May 3, 1993, now U.S. Pat. No. 5,286,937, which is a division of application Ser. No. 07/499,454, filed Jun. 27, 1990, now U.S. Pat. No. 5,224,591.

TECHNICAL FIELD

The present invention relates to a panel switch for operating electronic apparatus and a method for making same, and more particularly to a panel switch for such use, employing a diaphragm in such a manner as to make good use of its resilient nature whereby the operator operates the switch with security.

BACKGROUND ART

FIGS. 7 and 8 are a cross-sectional view and an exploded view showing a conventional panel switch. The switch has an insulated substrate 2 on which a first contact point la and a second contact point 1*b* are formed. The reference numeral 3 denotes a spacer having a through hole 3*a*. The spacer 3 has adhesive layers on opposite sides, and accommodates a spherical or cylindrical resilient metal diaphragm 4. The diaphragm 4 is covered with an elastic sheet 5. The reference numeral 7 denotes a casing which holds a press button 6. The diaphragm 4 keeps contact with the second contact point 1*b*.

For operation, an operator pushes the press button 6 so that the diaphragm 4 is pressed and comes into contact with the contact point 1*a* through the sheet 5, thereby effecting electrical connection between the contact points 1*a* and 1*b* by way of the diaphragm 4.

This type of panel switch has the following disadvantages:

One is that the spacer 3 is indispensable for maintaining the diaphragm 4 and cannot be omitted. The cost of the spacer is reflected in the production cost. Another disadvantage is that the diaphragm 4 must be individually inserted into the apertures of the spacers 3, thereby consuming time and labor. In addition, the boring of the apertures produces chips, dirt and adhesive remains, which are likely to cause poor contact between the diaphragm 4 and the contact points 1*a*, 1*b*.

SUMMARY OF THE INVENTION

In order to solve the problems pointed out above, the present invention provides a panel switch capable of economical production. The object is achieved by providing a panel switch which comprises preparing a sheet having an adhesive layer on one side, attaching a diaphragm to the adhesive layer of the sheet, and attaching the sheet to an insulated substrate, thereby constituting a panel switch.

Thus, there is no need for sing a spacer, thereby saving cost and labor.

DESCRIPTION OF THE BEST MODE OF THE EMBODIMENT

Figure 1:
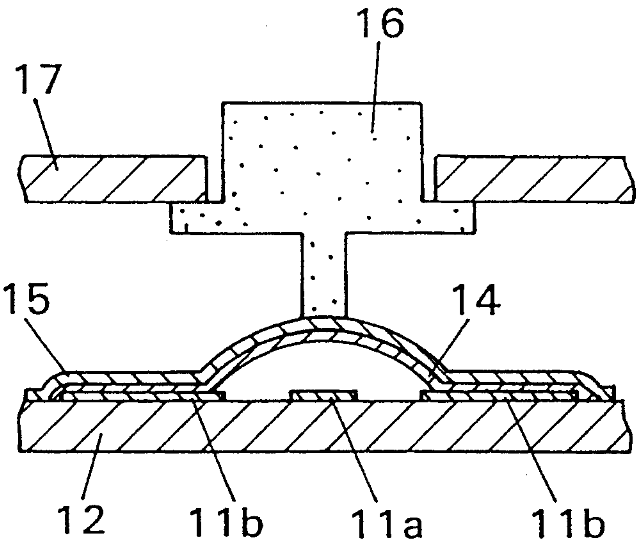
FIG. 1 is a cross-sectional view showing a panel switch according to the present invention.

The present invention will be described by way of example shown in the drawing:

EXAMPLE 1

Figure 2:
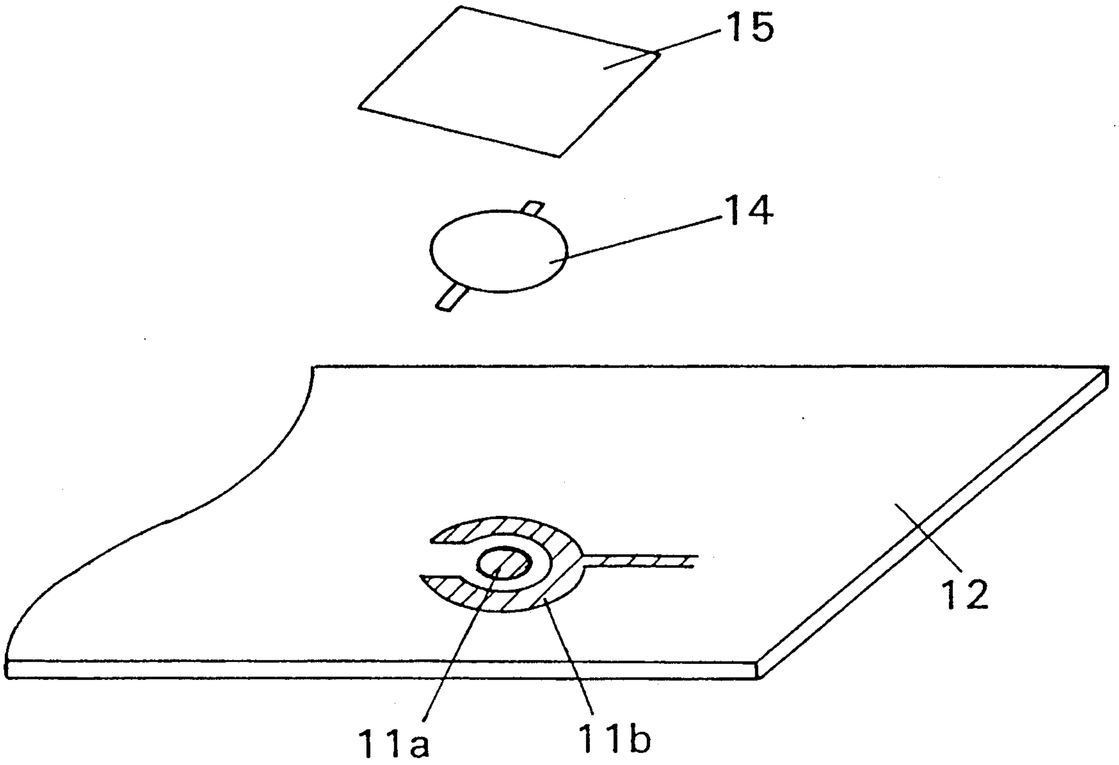
FIG. 2 is an exploded view showing a main portion of the panel switch of FIG. 1.
Figure 3A:
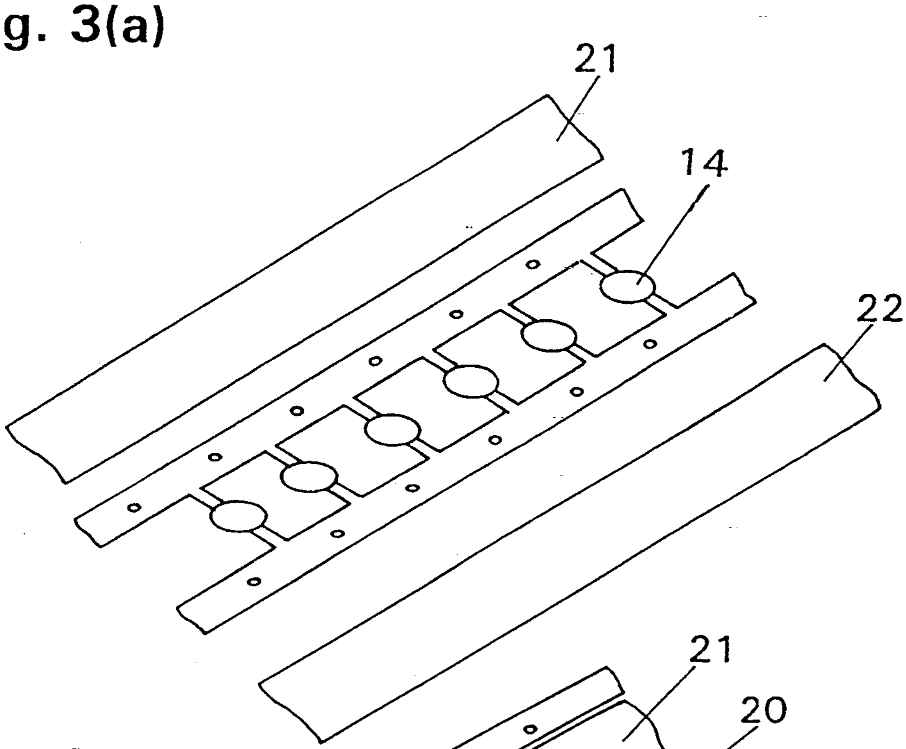
FIG. 3 is a diagrammatic view showing the steps of fabricating a panel switch according to the present invention.
Figure 3B:
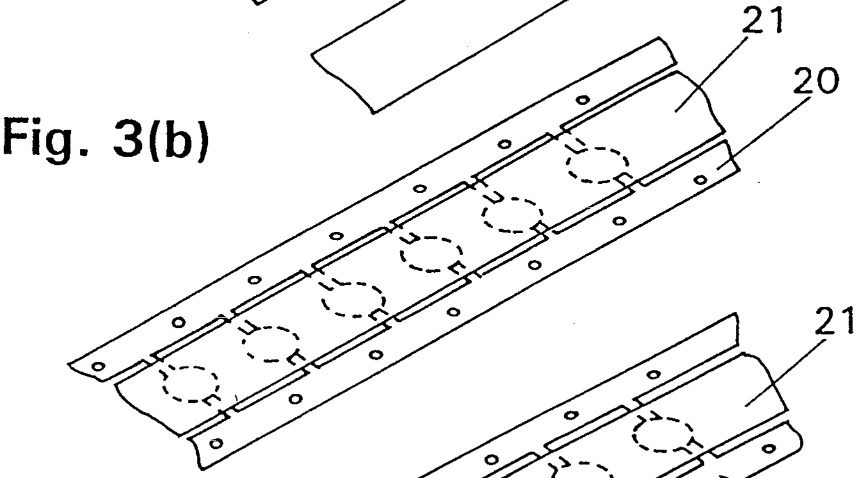
Figure 3C:
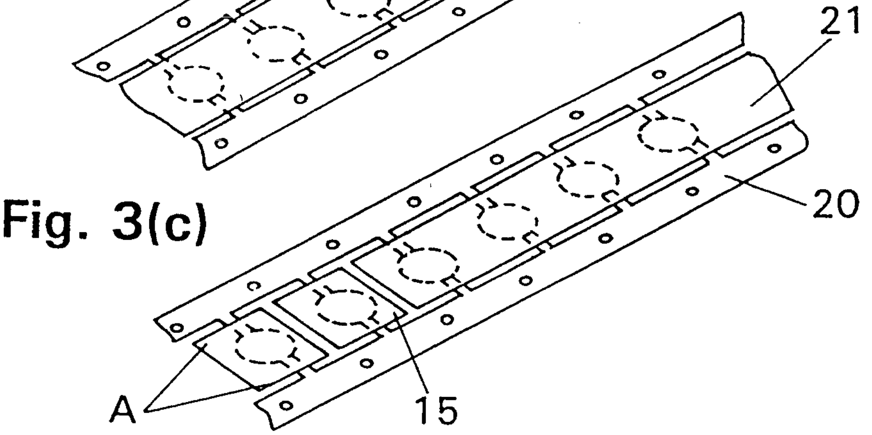
Figure 3D:
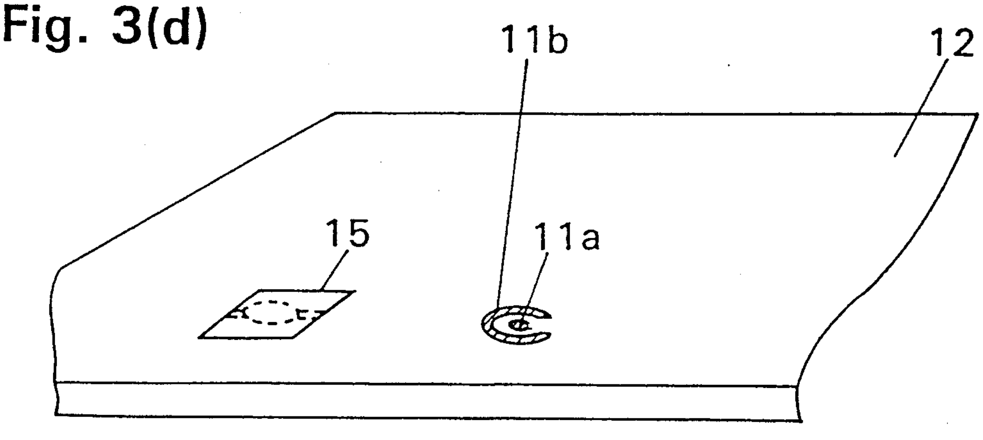

Referring to FIGS. 1 and 2, the panel switch is provided with an insulated substrate 12 having contact points 11*a*, 11*b*. The panel switch is provided with a spherical or cylindrical resilient metal diaphragm 14, which is connected to the contact point 11*b*. The reference numeral 15 denotes an elastic sheet having an adhesive layer on one side. The sheet 15 is attached to the diaphragm 14 and also to the substrate 12 so that he diaphragm 14 is united with the substrate 12. The panel switch is provided with a press button 16 held by a casing 17. The button 16 is suspended in such a posture as to be in abutment with the diaphragm 14 through the sheet 15. The casing 17 and the press button 16 constitute an operation section.

In operation, an operator presses the press button 16 which then pushes the diaphragm 14 through the sheet 15. In this way the diaphragm 14 comes into contact with the contact point 11*a*, thereby effecting electrical connection between the contact points 11*a* and 11*b* through the diaphragm. The adhesive to be coated on the sheet 15 should be selected from substances which do not impair the resiliency of the diaphragm 14.

Referring to FIG. 3, the process of fabricating the panel switch described above will be described:

FIGS. 3(*a*), (*b*), (*c*), and (*d*) respectively show a tape having its releasable sheet removed, a strip of hoop-like diaphragms to which the tape is attached, tape pieces cut for each unit diaphragm, and an insulated substrate 12 on which the unit diaphragm is attached. As shown in FIGS. 3 (*a*) to (*d*) there are prepared a strip of hoop-like diaphragms 20, each unit diaphragm 14 being of a spherical or cylindrical shape, and tape 21 lined with an adhesive layer covered with a protective releasable sheet 22. The releasable sheet 22 is designed to protect the adhesive layer of the tape 21 from dirt. The insulated substrate 12 is provided with several pairs of contact points 11*a* and 11*b*. The tape 21 will be referred to as the sheet 15 at the later stage.

The panel switch is fabricated in the following manner:

First, the protective releasable tape 22 is removed from the tape 21, so as to attach the tape 21 to the strip of hoop-like diaphragms 20. Then the tape 21 is cut into tape pieces for each unit diaphragm 14 as shown in FIG. 3(*c*). From this stage the tape pieces are referred to as sheets 15, and the unit diaphragms 14 are sucked by a vacuum device or any other similar automatic device, and bridge portions A thereof are cut. Each unit diaphragm 14 is placed on the contact point 11*b* on the substrate 12, and secured to the substrate 12 by the sheet 15. Then the substrate 12 with the diaphragm 14 is united with the casing 17 having the press button 16. Preferably, after the panel switch is finished, the releasable tape 22 can be again attached to the tape, 21 after it has been joined to the strip of hoop-like diaphragms 20, and removed therefrom when the unit diaphragms 14 are secured to the insulated substrates 12.

EXAMPLE 2

Figure 4:
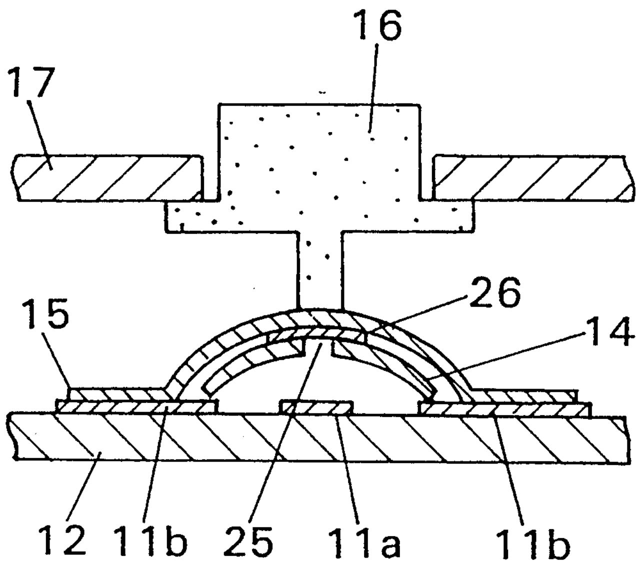
FIG. 4 is a cross-sectional view showing a modified version of the panel switch according to the present invention.
Figure 5:
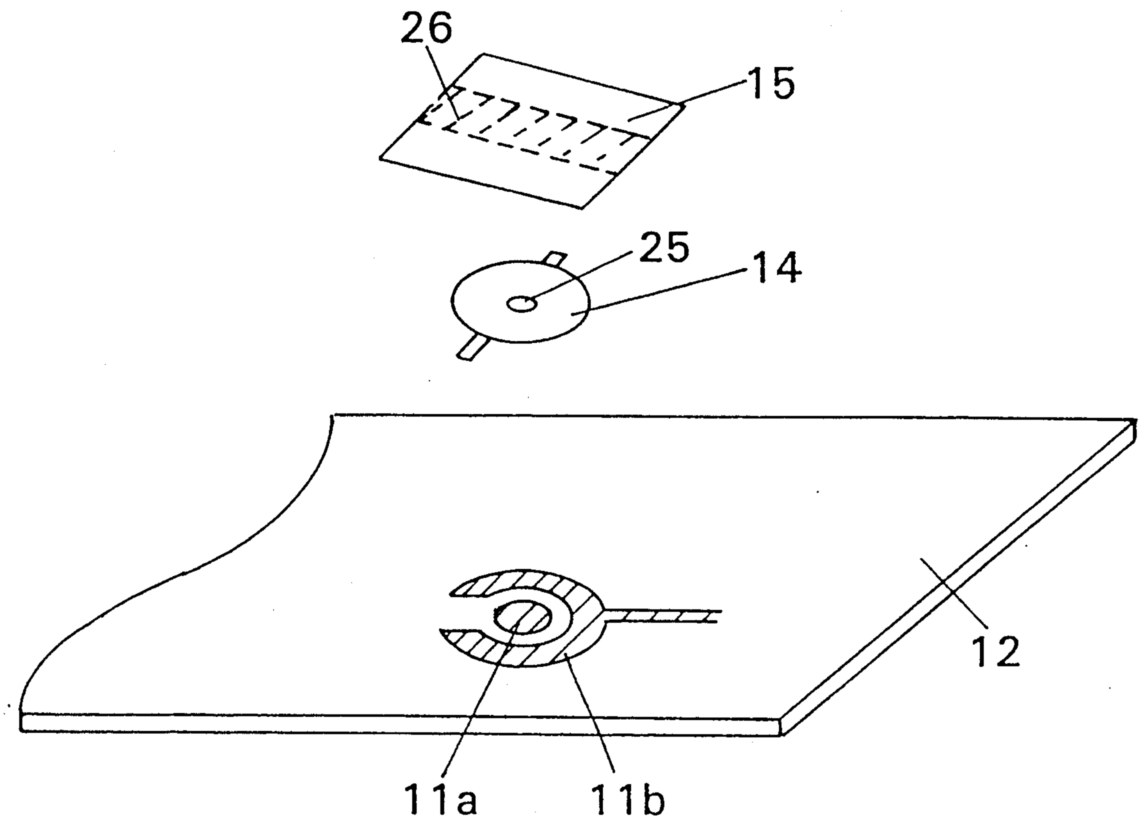
FIG. 5 is an exploded view showing a main portion of the panel switch of FIG. 4.
Figure 6A:
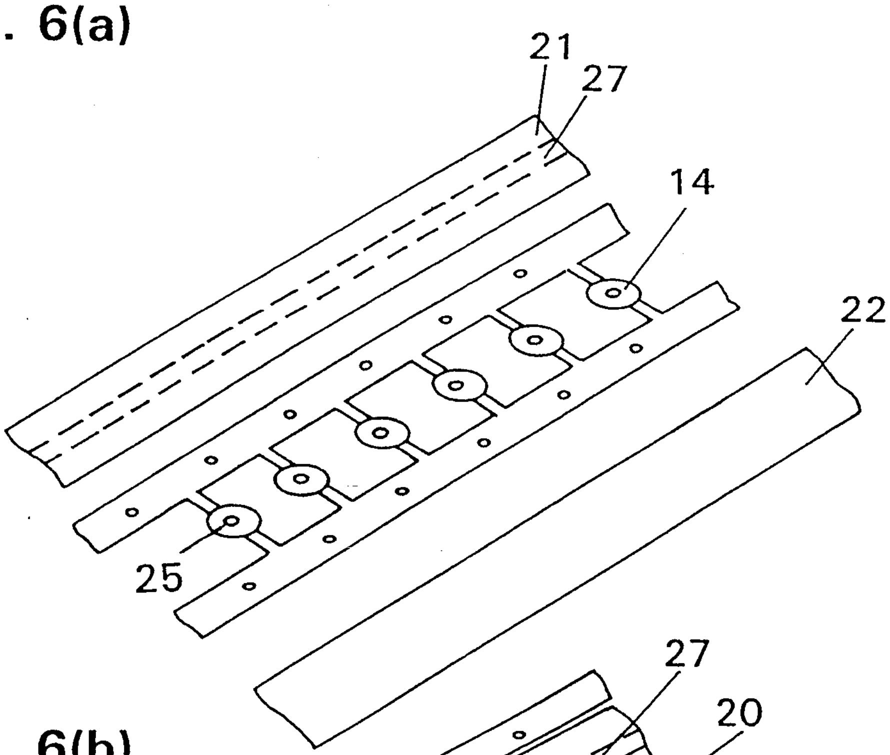
FIG. 6 is a diagrammatic view showing the steps of fabricating the panel switch of FIG. 4.
Figure 6B:
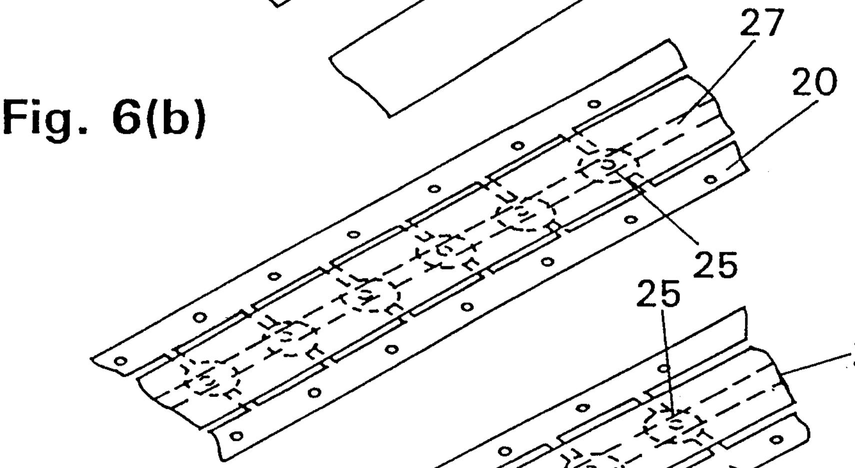
Figure 6C:
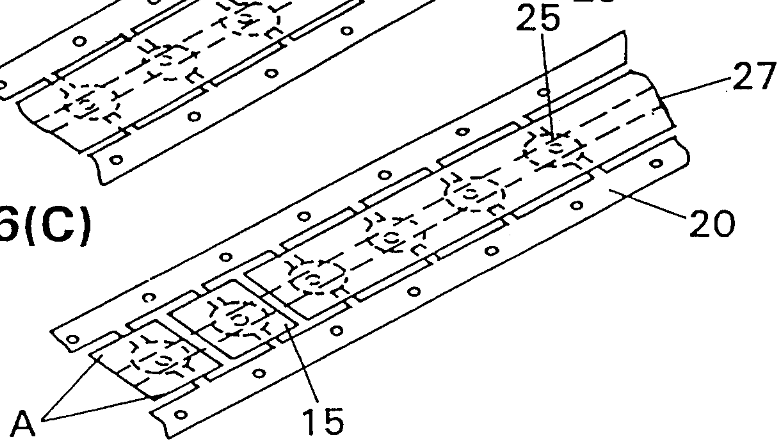
Figure 6D:
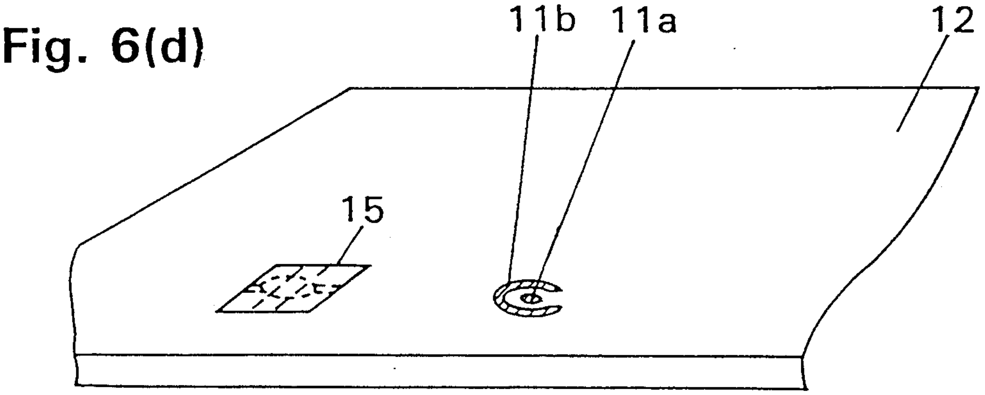
Figure 7:
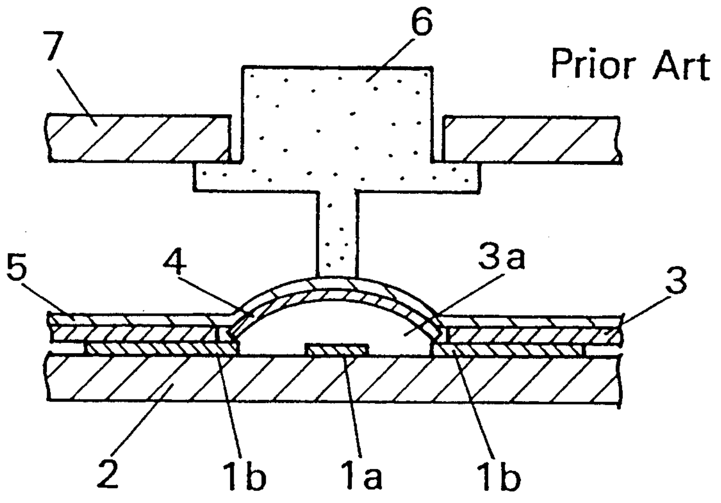
FIG. 7 is a cross-sectional view showing a conventional panel switch.
Figure 8:
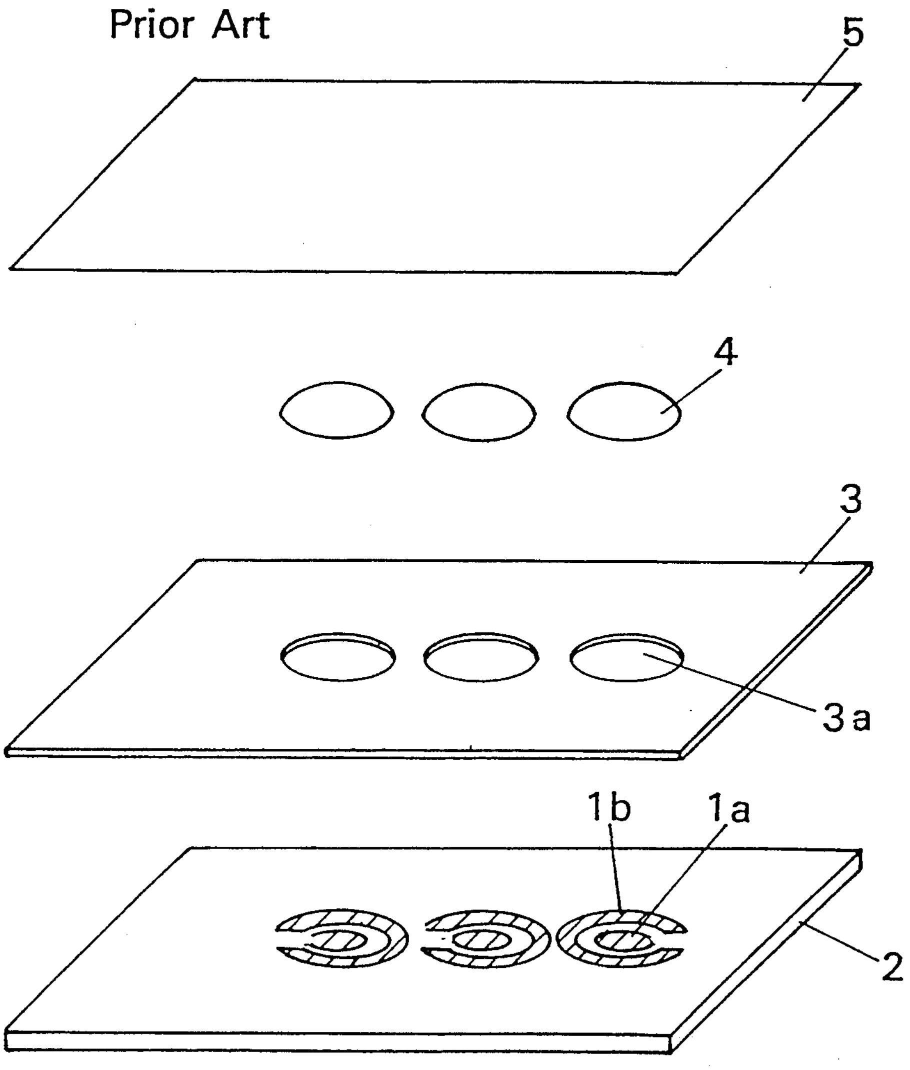
FIG. 8 is an exploded view showing a main portion of the conventional panel switch of FIG. 7.

Referring to FIGS. 4 and 5, wherein like reference numerals correspond to like components in FIGS. 1 and 2 and the description of them is omitted, each diaphragm 14 has a central aperture 25 in the center. When the diaphragm 14 is pressed against the contact point 11*a*, the peripheral edge of the central aperture 25 is more surely placed in contact with the contact point 11*a* than otherwise. This secures a reliable switch. The reference numeral 26 denotes an adhesion-prohibiting layer formed on the under-surface of the sheet 15 by printing or by joining another cover sheet thereto. This adhesion-prohibiting layer 26 protects the peripheral edge of the central apertures 25 and the contact point 11*a* from becoming stained with an adhesive, thereby securing the contact between the diaphragm 15 and the contact point 11*a* . In the illustrated embodiment a strip of adhesion prohibiting layer 26 is used, but the shape is not limited to it if the adhesion-prohibiting layers 26 can cover the respective central apertures 25. Instead of using the adhesion-prohibiting layer 26, an alternative method is to dispense with the coating of an adhesive at the spots of diaphragm that correspond to the central apertures 25. When the adhesion-prohibiting layer 26 of strip is used, the advantage is that the air trapped in the diaphragm 14 is allowed to escape when the diaphragm 14 is pressed against the contact point 11*a* , thereby enabling the operator to feel assured of the operability of the switch.

Referring to FIG. 6, the process of fabricating the example illustrated in FIGS. 4 and 5 will be described:

FIGS. 6(*a*), (*b*), (*c*), and (*d*) respectively show a tape having its releasable sheet removed and having the adhesion-prohibiting tape 26 attached, a strip of hoop-like diaphragms 20 to which the tape is attached, tape pieces cut for each unit diaphragm 14, add an insulated substrate 12 on which the unit diaphragm 14 is attached to the substrate 12. In FIG. 6 like reference numerals indicate like components in FIG. 3 and FIGS. 4, 5, and the description of these components will be omitted for simplicity. As shown in FIGS. 6(*a*) to (*d*), the tape 21 is provided with an adhesion-prohibiting layer 27 having a smaller width than that of the tape 21, and is attached to the tape 21 so as to cover the respective central apertures 25 of each of the diaphragms 14 when the tape 21 is overlaid on the strip of hoop-like diaphragms 20. Instead of using the adhesion-prohibiting layer 27, an alternative way is to cover the adhesive layer by printing or with any other medium.

INDUSTRIAL APPLICABILITY

As evident from the foregoing description, the diaphragm is secured to the insulated substrate with the sheet without the use of any spacer. The non-use of the spacer saves the cost and labor, thereby providing an economical panel switch. The diaphragm is prepared in a continuous hoop, and after the adhesive tape is,attached thereto, the diaphragm is cut into units, and the unit diaphragms each are covered with the sheets which are secured to the insulated substrate. As a result, the following advantages have been achieved:

(1) Until the unit diaphragm is sucked by an automatic device, it is kept continuous as a hoop, thereby avoiding the production of panel switches having two diaphragms attached.

(2) Since the diaphragms are individually united with the casings, the same process can be applied regardless of variations in the optional arrangement of keys on equipment.

(3) The method of the invention eliminates the use of any spacer, and each diaphragm is independent of each other. Thus, modifications and variations in design and shape can be freely done, thereby speeding up the production and saving on the cost.

We claim:

1. A process for making a panel switch, the process comprising the steps of:
   - preparing a strip of tape having a width, a strip direction, and an adhesive layer on one side, a central part of the adhesive layer being covered with a strip of an adhesion-prohibiting layer having a width smaller than that of the adhesive layer and a strip direction generally parallel with respect to that of the tape;
   - preparing a strip of hoop-like diaphragms, each of the diaphragms having a central aperture;
   - joining the tape to the strip of hoop-like diaphragms so that the central apertures are covered with the adhesion-prohibiting layer;
   - cutting the joined tape and the strip of hoop-like diaphragms into unit diaphragms; and
   - securing each unit diaphragm to a substrate at respective contact points thereon.

2. A process for making a panel switch, the process comprising the steps of:
   - preparing a strip of hoop-like diaphragms, each of the diaphragms having a central aperture;
   - preparing a strip of tape having a width, a strip direction, and an adhesive layer on one side, wherein the tape has no adhesive at spots corresponding to the central apertures of the diaphragms;
   - joining the tape to the strip of hoop-like diaphragms so that the central apertures are not covered with the adhesive;
   - cutting the joined tape and the strip of hoop-like diaphragms into unit diaphragms; and
   - securing each unit diaphragm to a substrate at respective contact points thereon.

* * * * *